United States Patent
Warmkessel et al.

(10) Patent No.: US 7,105,207 B2
(45) Date of Patent: Sep. 12, 2006

(54) UV CURABLE OLIGOMERIC ADHESIVE COMPOSITIONS SUITABLE FOR USE IN FLEXIBLE PACKAGING APPLICATIONS

(75) Inventors: Jeffrey R. Warmkessel, Worthington, OH (US); Randy A. Johnson, Hilliard, OH (US); Thomas M. Moy, Hilliard, OH (US); Vincent J. Pascarella, Perrysville, OH (US); Raymond Scott Harvey, Worthington, OH (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 0 days.

(21) Appl. No.: 10/217,345

(22) Filed: Aug. 12, 2002

(65) Prior Publication Data

US 2004/0029991 A1 Feb. 12, 2004

(51) Int. Cl.
| | |
|---|---|
| C08F 2/46 | (2006.01) |
| C08F 7/18 | (2006.01) |
| B32B 27/06 | (2006.01) |
| B32B 27/30 | (2006.01) |
| B32B 27/16 | (2006.01) |

(52) U.S. Cl. ............... 427/516; 427/508; 427/517; 427/207.1; 427/208.4; 428/423.1; 428/423.7; 428/424.4; 428/424.8; 428/345; 428/355 AC; 428/355 EN; 522/39; 522/65; 522/36; 522/70; 522/173; 522/178; 522/182; 522/183

(58) Field of Classification Search ............ 428/423.1, 428/423.7, 424.4, 424.8, 345, 355 AC, 355 EN; 522/39, 65, 36, 70, 173, 178, 182, 183; 427/508, 427/516, 517, 207.1, 208.4
See application file for complete search history.

(56) References Cited

U.S. PATENT DOCUMENTS

| | | | |
|---|---|---|---|
| 3,925,349 A | 12/1975 | Gaske | 204/159.15 |
| 4,078,015 A | 3/1978 | Leitheiser et al. | 260/859 R |
| 4,246,391 A | 1/1981 | Watson, Jr. | 528/49 |
| 4,284,731 A | 8/1981 | Moser et al. | 525/28 |
| 4,920,157 A | 4/1990 | Schulz et al. | 522/96 |
| 5,328,940 A | 7/1994 | Zimmer | 522/31 |
| 5,741,829 A | 4/1998 | Reich et al. | 522/35 |
| 5,859,084 A | 1/1999 | Schröder et al. | 522/34 |
| 6,025,410 A * | 2/2000 | Moy et al. | 522/182 |

FOREIGN PATENT DOCUMENTS

| | | |
|---|---|---|
| EP | 0658582 | 12/1994 |
| JP | 3054216 | 3/1991 |
| WO | WO 98/31541 * | 7/1998 |

OTHER PUBLICATIONS

Polyurethane Handbook, 2$^{nd}$ ed., Gunter Oertel, ed., Hanser Publishers, New York: 1994, pp. 94-96, 565-566.*

* cited by examiner

Primary Examiner—Sanza L. McClendon
(74) Attorney, Agent, or Firm—Martin Connaughton

(57) ABSTRACT

The present invention relates to flexible package laminates useful in food packaging that are prepared using a liquid, UV curable, oligomeric, adhesive composition that does not require a photoinitiator.

24 Claims, No Drawings

UV CURABLE OLIGOMERIC ADHESIVE COMPOSITIONS SUITABLE FOR USE IN FLEXIBLE PACKAGING APPLICATIONS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Radiation curable adhesives containing acrylate functionality are known. However, this type of adhesive is not practical for flexible packaging applications because of odor associated with the presence of low molecular weight acrylates remaining in the crosslinked adhesive compositions, extractables and non-compliance with FDA regulations. In addition, radiation curable acrylate adhesives typically require a photoinitiator. These photoinitiator containing adhesives are unsuitable for use in flexible packaging applications such as the food packaging industry because of odor and non-compliance with FDA regulations related to unreacted initiator and initiator fragments. An example of this technology is U.S. Pat. No. 5,328,940 which discloses cationically cured compositions containing an epoxy compound, a hydroxy-terminated polyurethane and a photoinitiator. Although some photoinitiators are now accepted for indirect food contact (21 CFR 175.105) users are also concerned about unreacted photoinitiator fragments passing through films into the packaged material. Furthermore, photoinitiators have a propensity for imparting color to a coating or adhesive and adding substantially to the cost of the adhesive formulation.

European Patent 658,582 discloses a prepolymer composition containing at least two methacrylate and at least two urethane and/or urea groups for use in thermally cured adhesives. U.S. Pat. Nos. 5,859,084 and 5,741,829 disclose acrylic compositions that have a photoinitator covalently bonded to a polymer chain in order to minimize extractable fragments. Japanese unexamined patent no. 3-45216 discloses photocurable compositions comprised of an unsaturated urethane-acrylate having at least one (meth)acryloyl group and urethane linkage per molecule and an acetoacetyl group containing (meth)acrylate having both (meth)acryloyl groups and an acetate ester group per molecule. According to the above referenced Japanese patent, UV curing requires a photoinitiator. U.S. Pat. No. 3,925,349 claims and discloses a UV curable non-gelled Michael addition reaction product of an aliphatic amine, a stoichiometric excess of a polyester of acrylic acid and a photosensitizer to render the product sensitive to UV radiation. U.S. Pat. No. 4,284,731 discloses radiation curable compositions comprised of a urethane prepolymer prepared by reacting a polyol and an isocyanate, dicyclopentyloxyalkylacrylate and/or methacrylate, and a photoinitiator. U.S. Pat. No. 4,920,157 discloses radiation curable contact adhesives consisting of the reaction product of diisocyanate, a polyol, an alkanediol, a hydroxyalkyl (meth)acrylate, and a monohydroxylalkylcarboxylic acid. This reaction product is mixed with a monovinyl compound. According to the patent, if curing is to be accomplished by UV radiation a photoinitiator is used.

The current solventless adhesive technology that dominates the flexible packaging industry is a two component urethane adhesive. While strides have been made to make the adhesive safer by reducing the amount of monomeric isocyanate compounds, known as generation advancements in the industry, the curing reaction is still urethane based and typically takes hours to fully react. The time needed to reach full cure can range from 24 to 150 hours depending on how low of an extractable level is required for the application. Extractable levels required for most food packaging are as low as 5 to 50 parts per billion of aromatic amines.

BRIEF SUMMARY OF THE INVENTION

The present invention relates to liquid, UV curable, oligomeric adhesives and their use in flexible packaging and in particular food packaging applications. The oligomers, when reacted with a Michael donor, UV cure without a photoinitiator. The UV curable, oligomeric adhesives of the present invention are comprised of acrylate terminated oligomers such as polyester acrylates, acrylate capped epoxy oligomers, polyacrylic acrylates, acrylate capped polyether polyols, acrylate terminated urethane oligomers or mixtures thereof. Of particular interest are the acrylate terminated urethane oligomers prepared by first reacting a polyisocyanate with an acrylate having an isocyanate reactive group and then reacting the acrylate-isocyanate reaction product with an excess of polyol. The acrylate capped urethane oligomer is then reacted with a Michael addition donor to form the UV curable oligomeric adhesive composition.

The UV curable oligomeric adhesive composition preferably has a molecular weight range of from 500 to 50,000 weight average molecular weight ($M_w$). The UV curable oligomeric adhesive composition is liquid at room temperature and cures when exposed to UV radiation without a photoinitiator. Preferably the UV curable oligomeric adhesive composition has a viscosity of from 10 centipoise at 15° C. to 30,000 centipoise at 80° C. Because the adhesive composition is essentially 100% oligomeric and there are no volatile components the cured adhesive has no odor and is suitable for use in food packaging. Because the adhesives are liquids at room temperature solvents are not necessary. Although it is not preferred, especially in food packaging applications, a solvent can be added to the compositions of the present invention.

BRIEF DESCRIPTION OF THE SEVERAL VIEWS OF THE DRAWING

Not Applicable

DETAILED DESCRIPTION OF THE INVENTION

The invention relates to liquid, UV curable, oligomeric adhesive compositions. The present invention further relates to a method of preparing the oligomeric adhesive compositions and their use in flexible packaging, in particular flexible packaging used in food packaging.

The UV curable, oligomeric adhesive compositions are comprised of the reaction product of:

a. an acrylate terminated oligomer, and
b. a Michael addition donor.

The UV curable, oligomeric adhesive compositions are liquid prior to curing and therefore do not require a solvent.

Acrylates used to prepare the acrylate terminated oligomer include hydroxyl functional acrylates. Examples of such acrylates are 2-hydroxyethyl acrylate, hydroxypropoxypropyl acrylate, hydroxypentyl acrylate and the like.

Polyesters useful in preparing the acrylate terminated oligomer include known polyesters. The polyesters are prepared by any known method. Examples of suitable polyesters includes adipate based diols and/or triols, and unsaturated polyesters with hydroxyl functional groups.

Epoxy oligomers are also useful when terminated with an acrylate. Examples of epoxy oligomers includes those based on the reaction product of bisphenol A and epichlorohydrin. The epoxy based composition is then reacted with an acrylate such as 2-hydroxyethylacrylate to form the acrylate terminated oligomer.

Polyacrylics with pendant hydroxyl groups are also useful in forming acrylate functional oligomers. Johnson Polymer's Joncryl line is an example of a polyacrylic with pendant hydroxyl groups. The hydroxyl group can be reacted with acrylic acid or glycidyl acrylate to produce an acrylic polymer with acrylate functional groups present.

Polyether polyols when acrylate capped can also be useful as the acrylate terminated oligomer in the invention.

Polyisocyanates useful in the preparation of the acrylate terminated urethane oligomers are the known aliphatic and aromatic polyisocyanates. Examples include, isophorone diisocyanate, hexamethylene diisocyanate, dicyclohexamethylene diisocyanate, toluene diisocyanate, diphenylmethane diisocyanate, a trimerization product of hexamethylene diisocyanate, and the like. Aliphatic polyisocyanates are preferred.

Polyols used to prepare the acrylate terminated urethane oligomer include polyether polyols such as polyoxypropylene glycol, polyoxyethylene glycol and copolymers of ethylene and propylene oxide. Polyesterpolyols can also be used. Examples of such include those compositions obtained from adipic acid and various alkane diols. Alkane diols such as 1,3-propanediol, 1,4-butanediol, 1,5-pentanediol and 1,6-hexanediol can be used as the polyol in the reaction with the acrylate and the polyisocyanate. Diisocyanates and polyols having two isocyanate reactive groups are preferred, however polyisocyanates and polyols having functionalities greater than two can be used so long as the UV curable, oligomeric adhesive compositions are liquid prior to curing.

The Michael addition donor present in the UV curable, oligomeric adhesive compositions include those listed in U.S. Pat. Nos. 5,945,489 and 6,025,410 which are herein incorporated by reference. Examples of useful Michael addition donors include methyl acetoacetate, ethyl acetoacetate, a malonic ester, 1,4-butanediol diacetoacetate, ethoxylated bisphenol A diacetoacetate, trimethylol propane triacetoacetate, polycaprolactone triacetoacetate, pentaerythritol tetracetoacetate, 1,3-pentanedione and the like.

In addition to the above, other components such as catalysts, polymerization control agents, inhibitors, antioxidants, wetting agents, adhesion promoters, fillers, solvents, etc. can be present. Examples of catalysts that promote the reaction of the polyisocyanates with the hydroxyl functional acrylate or the polyol includes stannous octoate, manganese octoate, cobalt octoate, and dibutyltin dilaurate. Catalysts for the reaction between the Michael addition donor and the acrylate terminated oligomer are any catalyst capable of promoting the Michael addition reaction. Bases such as potassium hydroxide and amines such as 1,8-diazabicyclo [5.4.0]undec-7-ene (DBU) are suitable. Polymerization control agents include benzoquinone, hydroquinone, phenothiazine and dodecylbenzene sulfonic acid. Fillers include finely divided silicon dioxide, bentonites or calcium carbonate. Although not preferred, solvents would include acetone, ethyl acetate, toluene, ethanol, 2-propanol and the like.

In order to obtain an acrylate terminated urethane oligomer having a molecular weight of from about 2,000 to about 10,000 $M_w$ and essentially free of acrylate monomer and unreacted isocyanate, a "reverse cook" method as described in U.S. Pat. No. 4,246,391 and herein incorporated by reference, is used. According to the "reverse cook" method one mole equivalent of a hydroxyl functional acrylate such as hydroxyethylacrylate is reacted with one mole of a polyisocyanate preferably having at least two isocyanate groups. The reaction product of the acrylate and the polyisocyanate is then typically reacted with a slight molar excess of polyol. Although an excess of polyol is preferred, it is not a requirement so long as there is sufficient polyol present to react with all the isocyanate. The reaction of all isocyanate groups can be accomplished so long as there is a ratio of at least one mole equivalent polyol per mole equivalent of isocyanate. The reaction conditions are held until no isocyanate functionality is detectable by titration in the reaction mixture. The final step in the preparation is performed by reacting the acrylate terminated urethane oligomer with a Michael addition donor such as ethyl acetoacetate. The reaction is carried out in the presence of a base capable of promoting the Michael Addition reaction. The Michael addition reaction may be carried out several ways. The Michael addition donor may be reacted with the base to form the anion prior to being dispersed in the acrylate oligomer. Or the Michael addition donor can be dispersed in the acrylate oligomer thoroughly before the addition of the base. Either way Michael addition occurs at the Michael donor. On completion of the reaction an FDA approved acid such as beta-carboxyethylacrylate or dodecylbenzenesulfonic acid can be added to the product to minimize viscosity buildup over time thus improving shelf life. The oligomer of the Michael product can be dissolved in solvent for application purposes. Depending on the viscosity of the acrylate oligomer, solvent may be added prior to the Michael reaction as long as the solvent is not acidic and preferably not strongly basic.

The solventless, UV curable, oligomeric, adhesives prepared as described above have very low or no odor. Based on head space analysis there are no volatiles detectable down to 10 ppb (parts per billion).

An application for this solventless, UV curable, oligomeric, adhesive composition is flexible packaging and in particular flexible packaging used in food packaging. Typical films used in food packaging include polyethylene, polyester, polyethylene terephthalate, oriented polypropylene, ethylene vinylacetate, co-extruded films and the like. Depending on the film used in a lamination the UV radiation necessary to cure the adhesive can be passed through the film or it may be necessary to irradiate the adhesive before mating the film surfaces. Curing after the laminate has been assembled restricts the films used to ones that are UV transparent. Oriented polypropylene has proven to be one of the best films because it absorbs only about 9–10% of the UV radiation. Polyethylene terephthalate based films absorb 40% of the UV radiation from an H bulb and are not practical candidates for the curing of the adhesives of the present invention by UV irradiation of the adhesives through the film.

The solventless, UV curable, oligomeric, adhesive composition can be coated on films by direct application, for example by knife coating, roller coating, casting or by means of a draw down bar. The adhesive composition can also be applied indirectly by the transfer method. A simple two layer laminate or multiple layered laminates can be prepared using the adhesive compositions of the invention.

The UV curable, oligomeric, adhesive compositions can be cured by H and D electrode/electrodeless systems. Typical curing dosages ranged from 200 mJ/cm$^2$ to 700 mJ/cm$^2$. A standard curing condition consisted of a 300 W/inch Fusion H bulb and 400 mJ/cm$^2$.

Having thus described the invention the following examples are meant to serve as illustrations and should not be construed as limiting in nature.

EXAMPLE 1

Step 1: Synthesis of Acrylate Terminated Urethane Oligomer

To a 1 L reactor kettle was weighed 167.9 g of isophorone diisocyanate (0.76 moles), 0.13 g dibutyltin dilaurate and 0.03 g p-benzoquinone. 91.8 g 2-hydroxyethylacrylate (0.79 moles) was added at a rate of 1 drop/sec over a period of 2.5 hours while bubbling dried house air through the mixture a with slight additional agitation. Heat was not applied to the kettle and a cool water bath was in place to keep the temperature below 35° C. If the temperature rose above 35° C. the addition of the 2-hydroxyethylacrylate was stopped until the temperature dropped below 35° C. After complete addition of the 2-hydroxyethylacrylate, the water bath was replaced with a heating mantle and the reaction kettle was heated to 60° C. over 30 minutes. Another charge of 0.06 g p-benzoquinone was added before adding 298.8 g Poly G 85-36 (0.19 moles) a glycerol initiated propylene oxide-ethylene oxide polyether polyol available from Arch Chemicals, Inc. and 291.5 g of Poly G 55-112 (0.58 moles) a propanediol initiated propylene oxide-ethylene oxide polyether polyol from Arch Chemicals, Inc. to the reactor kettle followed by 0.72 g dibutyltin dilaurate. Agitation was increased to >300 rpm and the reactor contents were held at 60° C. until a % isocyanate of zero was attained. The NCO index (equivalents NCO/equivalents OH) was 0.985. Upon cooling, 0.025 g p-benzoquinone dissolved in 0.5 g ethanol was dispersed in the contents of the reactor kettle. The acrylated urethane oligomer can be used by itself and as a component in a solventless adhesive formulation.

Step 2: Michael Adduct Formulation

For a 2:1 Michael ratio, i.e. 2 moles of acrylate terminated urethane oligomer to 1 mole ethyl acetoacetate, 50 g acrylate terminated urethane oligomer was added to a reactor kettle. 1.27 g ethyl acetoacetate (9.8 mmole) and a 2.6 molar solution of potassium hydroxide in ethanol was added to a 20 cc vial to form the acetoacetate anion. The acetoacetate/potassium hydroxide solution was added slowly to the reactor kettle with stirring. A slight exotherm (1 to 5° C.) and color change accompanied the reaction. After 20 min. of thorough agitation 0.0787 g of beta-carboxyethylacrylate (0.5 mmoles) was added to the stirred contents of the reactor kettle. The Michael adduct of the acrylated urethane oligomer can be used by itself or as a component in a solventless adhesive. A 3:1 Michael addition ratio can be prepared in the same manner.

EXAMPLE 2

Lamination and Curing of the Solventless Adhesive Lab Procedure

An oriented polypropylene sheet of film (12"×12") was placed on a glass surface. An adhesive formulation from example 1 was evenly applied to the film by a conventional drawdown bar. The coat weight of the adhesive was 0.1 to 0.2 mils. A 2 inch by 4 inch piece of paper was placed horizontally across the draw down. This sheet of paper provided areas of uncured adhesive to start T-Peel testing. The adhesive covered sheet was then mated by a lab press (5 psi) to a similar sized sheet of linear low density polyethylene to form a laminate. The laminate was placed on the conveyor belt of a Fusion F450 (300 W/in) Ultraviolet Lamp System and subjected to 400 mJ/cm$^2$ of ultraviolet radiation (H bulb).

Comparison of acrylated urethane oligomer (Example 1, Step 1) with photoinitiator and a Michael adduct (Example 1, Step 2) with no photoinitiator. A laminate comprised of oriented polypropylene/adhesive/linear low density polyethylene as described in Example 2 was prepared.

Bond values reported are from a 180° T-Peel test. Samples for testing were 1 inch by 6 inch strips cut out of UV cured laminations. Approximately 1 inch of the strip end included the paper that was placed in the lamination before mating to the secondary film. The 1 inch by 1 inch area at the end of the strip provides material to be placed in the jaws of the instron. The primary web (OPP) was placed in the lower instron jaw and the secondary film (PE) was placed in the upper instron jaw. The other end of the strip was supported horizontally to form a 90° angle with the vertical instron jaw placement. The test rate was 12 inches per minute.

TABLE 1

| | 180° T-Peel bond values[a] UV dosage (mJ/cm$^{2d}$) | | |
|---|---|---|---|
| Resin | 300 | 400 | 500 |
| Acrylated-urethane + Irg 1700[c] | 230 | 410[b] | 410 |
| 2:1 Michael adduct | 250 | 430 | 544 |
| 3:1 Michael adduct | 320 | 730 | 680 |

[a]180° T-Peel bond values were reported in grams per linear inch
[b]Values in bold indicate failure of the oriented polypropylene occurred before adhesive failure.
[c]Irg 1700 was used at 1.2 wt. % in the control test. Irg 1700 is a blend of two photoinitiators from Ciba. The blend comprises of 25 wt. % bis (2,6-dimethylbenzoyl)-2,4-trimethylpentyl phosphine oxide and 75 wt. % 2-hydroxy-2-methyl-1-pheynyl-propan-1-one.
[d]H bulb, 300 W/in.

From Table 1 it can be seen that the Michael adduct without photoinitiator performed better than the acrylated urethane oligomer with photoinitiator. When each lamination was cured at 400 mJ/cm2, the T-Peel test resulted in oriented polypropylene film failure. It is interesting to note that the laminations with the Michael adduct recorded higher bond values than the acrylated urethane oligomer with photoinitiator.

EXAMPLE 3

Lamination and Curing of Solventless Adhesive on Industrial Laminator

An acrylate urethane oligomer was prepared as in Example 1.

TABLE 2

Formulation for acrylate urethane oligomer. Used as control by adding 1.2 wt. % Irgacure 1700 photoinitiator.

|  | functional group equivalents | grams charged | weight percent |
|---|---|---|---|
| isophorone diisocyanate | 1 | 111.15 | 12.32 |
| 2-hydroxyethylacrylate | 0.5 | 59.86 | 6.63 |
| Acclaim 6320* | 0.175 | 357.00 | 39.57 |
| Acclaim 2220N** | 0.325 | 372.85 | 41.32 |
| Dibutyltin dilaurate |  | 1.35 | 0.15 |
| Benzoquinone |  | 0.09 | 0.01 |
|  |  | 902.3 | 100 |

*Acclaim 6320 is a glycerol initiated propylene oxide-ethylene oxide polyether polyol available from Bayer.
**Acclaim 2220N is a propanediol initiated propylene oxide-ethylene oxide polyether polyol.

The above acrylate urethane oligomer was reacted with ethyl acetoacetate in the molar ratio 4:1 to make the formulation listed as 4:1 Michael adduct. The other ratios, 3:1, 2.5:1 and 2:1, are made in a similar fashion with the same acrylate urethane.

TABLE 3

|  | moles | grams charged | weight percent |
|---|---|---|---|
| acrylated-urethane oligomer | 4 | 200 | 99.1 |
| ethyl acetoacetate | 1 | 1.47 | 0.7 |
| potassium hydroxide in |  | 0.31 | 0.2 |
| ethanol (0.15 g/mL) |  |  |  |
|  |  | 201.78 | 100 |

Laminations of oriented polypropylene (OPP) to linear low density polyethylene (LLDPE) were constructed and cured using a solventless laminator equipped with a bank of UV lamps. An adhesive application station consisting of smooth rolls applied the adhesive at 1 lb./ream (0.06 mils). UV radiation was applied through the OPP after the LLDPE was mated to the adhesive-coated OPP. The UV bank consisted of three rows containing two lamps each for a total of six lamp units.

Laminations were constructed and cured at 100, 200 and 400 feet per minute (fpm). Considering the output of each bulb, a line speed of 200 fpm subjected the lamination to a dosage of approximately 400 mJ/cm$^2$. The UV bulbs used were microwave-induced H+ bulbs at 100% output (600 W/in.).

180° T-Peels bond values were measured to compare the performance of the Michael adducts (without photoinitiators) against similar acrylated urethane oligomers with photoinitiator. The photoinitiator loading was 1.2 wt. % in the control adhesive. The laminations had adhesive coat weights of 1.0 to 1.2 lbs/ream.

TABLE 4

|  | 180° T-Peel bond values[a] line speed (feet per minute) | |
|---|---|---|
|  | 100 | 200 |
| Acrylated-urethane + Irg 1700[c] | 175 | 80 |
| 4:1 Michael adduct | 305 | 125 |
| 3:1 Michael adduct | 363[b] | NA |
| 2.5:1 Michael adduct | NA | 271 |
| 2:1 Michael adduct | 278 | NA |

[a]180° T-Peel bond values were reported in grams per linear inch
[b]Values in bold indicate failure of the oriented polypropylene occurred before adhesive failure.
[c]Irg 1700 was used at 1.2 wt. % in the control test. Irg 1700 is a blend of two photoinitiators from Ciba. The blend comprises of 25 wt. % bis (2,6-dimethoxybenzoyl)-2,4-trimethylpentyl phosphine oxide and 75 wt. % 2-hydroxy-2-methyl-1-pheynyl-propan-1-one.

The cured laminations made with the Michael adducts without photoinitiator had higher bond values than the control adhesive. The only lamination which resulted in OPP film tear when tested was the 3:1 Michael adduct adhesive. NA in the table represents laminations not made at the trial.

We claim:

1. A process for preparing a flexible film laminate, comprising;
   a. applying a liquid, UV curable, oligomeric, adhesive composition comprising the reaction product of,
      i. an acrylate terminated oligomer having a weight average molecular weight from about 2,000 to about 10,000, and
      ii. one or more Michael addition donors selected from the group consisting of methyl acetoacetate, ethyl acetoacetate, a malonic ester, 1-3-pendanedione, 1,4-butanediol diacetoacetate, ethoxylated bisphenol A diacetoacetate, trimethylol propane triacetoacetate, polycaprolactone triacetoacetate, and pentaerythritol tetraacetoacetate, where the liquid, UV curable, oligomeric, adhesive composition is a liquid at room temperature and does not contain a photoinitiator, to the surface of at least one layer of a flexible film,
   b. forming the laminate by contacting the surface of the adhesive bearing surface flexible film with the surface of a second flexible film, and
   c. curing the liquid, UV curable, oligomeric, adhesive composition by application of UV radiation either immediately after the application of the adhesive to at least one flexible film layer but prior to forming the laminate or by curing after the laminate has been formed.

2. The process as claimed in claim 1, wherein the acrylate terminated oligomer is an acrylate terminated polyester, epoxy oligomer, polyacrylic, polyether polyol, urethane oligomer or mixtures thereof.

3. The process as claimed in claim 1, wherein the acrylate terminated oligomer is an acrylate terminated urethane oligomer.

4. A process for preparing a flexible film laminate, comprising;
   a. applying a liquid, UV curable, oligomeric, adhesive composition comprising the reaction product of,
      i. an acrylate terminated urethane oligomer prepared by first reacting one molar equivalent of an acrylate having an isocyanate reactive group per mole of a polyisocyanate having at least two isocyanate groups and then reacting the product of the acrylate and the isocyanate with a polyol in a ratio of at least one mole equivalent of polyol per mole equivalent of isocyanate, and ii. one or more Michael addition donors selected from the group, consisting of; methyl acetoacetate, ethyl acetoacetate, a malonic ester, pentanedione, 1,4-butanediol diacetoacetate, ethoxylated bisphenol A diacetoacetate, trimethylol propane triacetoacetate, polycaprolactone triacetoacetate, and pentaerythritol tetraacetoacetate, where the liquid, UV curable, oligomeric, adhesive composition is a liquid at room temperature and does not contain a photoinitiator, to the surface of at least one layer of a flexible film, b. forming the laminate by contacting the surface of the adhesive bearing surface flexible film with the surface of a second flexible film, and c. where the liquid, UV curable, oligomeric, adhesive composition is cured by application of UV radiation either immediately after the application of the adhesive to at least one flexible film layer but prior to forming the laminate or by curing after the laminate has been formed.

5. The process of claim 4, where the acrylate having an isocyanate reactive group is 2-hydroxyethylacrylate.

6. The process of claim 4, where the polyisocyanate is an aliphatic polyisocyanate.

7. The process of claim 4, where the polyisocyanate is isophorone diisocyanate.

8. The process of claim 4, where the Michael addition donor is ethyl acetoacetate.

9. The process of claim 4, where the liquid, UV curable, oligomeric, adhesive composition further comprises an FDA approved acid wherein the acid is beta-carboxyethylacrylate or dodecylbenzene sulfonic acid.

10. The process of claim 4, where the flexible film is polyethylene, polyester, oriented polypropylene, or ethylene vinylacetate.

11. The process of claim 4, where the liquid, UV curable oligomeric adhesive composition further comprises a solvent.

12. A laminate, comprising;
a. at least two layers of a flexible film, and
b. between said layers of flexible film a UV cured reaction product of a liquid, UV curable, oligomeric, adhesive composition, comprising the reaction product of;
  i. an acrylate terminated oligomer having a weight average molecular weight from about 2,000 to about 10,000, and
  ii. one or more Michael addition donors selected from the group consisting of; methyl acetoacetate, ethyl acetoacetate, a malonic ester, 1,3-pentanedione, 1,4-butanediol diacetoacetate, ethoxylated bisphenol A diacetoacetate, trimethylol propane triacetoacetate, polycaprolactone triacetoacetate, and pentaerythritol tetraacetoacetate, where the liquid, UV curable, oligomeric, adhesive does not contain a photoinitiator.

13. The laminate of claim 12, where the Michael addition donor is ethyl acetoacetate.

14. A laminate, comprising;
a. at least two layers of a flexible film, and
b. between said layers of flexible film a UV cured reaction product of a liquid, UV curable, oligomeric, adhesive composition, comprising the reaction product of;
  an acrylate terminated urethane oligomer prepared by first reacting one molar equivalent of an acrylate having an isocyanate reactive group, per mole of a polyisocyanate having at least two isocyanate groups and then reacting the product of the acrylate and the isocyanate with a polyol in a ratio of at least one mole equivalent of polyol per mole equivalent of isocyanate, and
  ii. one or more Michael addition donors selected from the group, consisting of; methyl acetoacetate, ethyl acetoacetate, a malonic ester, 1,3-pentanedione, 1,4-butanediol diacetoacetate, ethoxylated bisphenol A diacetoacetate, trimethylol propane triacetoacetate, polycaprolactone triacetoacetate, and pentaerythritol tetraacetoacetate, where the liquid, UV curable, oligomeric, adhesive does not contain a photoinitiator.

15. The laminate of claim 14, where the acrylate having an isocyanate reactive group is 2-hydroxyethylacrylate.

16. The laminate of claim 14, where the polyisocyanate is an aliphatic polyisocyanate.

17. The laminate of claim 14, where the polyisocyanate is isophorone diisocyanate.

18. The laminate of claim 14, where the Michael addition donor is ethyl acetoacetate.

19. The laminate of claim 14, where the liquid, UV curable, oligomeric, adhesive composition further comprises an FDA approved acid wherein the acid is beta-carboxyethylacrylate or dodecylbenzene sulfonic acid.

20. The laminate of claim 14, where the flexible film is polyethylene, polyester, oriented polypropylene, or ethylene vinylacetate.

21. The laminate of claim 14, where the liquid, UV curable oligomeric adhesive composition further comprises a solvent.

22. A composition comprising; an adhesive wherein the adhesive is the UV cured reaction product of a liquid, oligomeric composition comprising the reaction product of;
a. an acrylate terminated oligomer having a weight average molecular weight from about 2,000 to about 10,000, and
b. one or more Michael addition donors selected from the group, consisting of; methyl acetoacetate, ethyl acetoacetate, a malonic ester, 1,3-pentanedione, 1,4-butanediol diacetoacetate, ethoxylated bisphenol A diacetoacetate, trimethylol propane triacetoacetate, polycaprolactone triacetoacetate, and pentaerythritol tetraacetoacetate; wherein the liquid, oligomeric composition does not contain a photoinitiator.

23. The composition as claimed in claim 22, wherein the acrylate terminated oligomer is an acrylate terminated polyester, epoxy oligomer, polyacrylic, polyether polyol, urethane oligomer or mixtures thereof.

24. The composition of claim 22, wherein the acrylate terminated oligomer is an acrylate terminated urethane oligomer.

* * * * *